United States Patent [19]

Helgerud et al.

[11] Patent Number: 5,548,562
[45] Date of Patent: Aug. 20, 1996

[54] METHOD FOR SYNCHRONIZATION OF SYSTEMS FOR SEISMIC SURVEYS, TOGETHER WITH APPLICATIONS OF THE METHOD

[75] Inventors: Per Helgerud, Hokksund; Helge Bragstad, Baerum, both of Norway

[73] Assignee: GECO A.S., Stavanger, Norway

[21] Appl. No.: 58,204

[22] Filed: May 10, 1993

[30] Foreign Application Priority Data

Jun. 30, 1992 [NO] Norway .................................... 922584

[51] Int. Cl.$^6$ ............................... G01V 1/38; G01V 1/26
[52] U.S. Cl. ................................. 367/14; 367/50; 181/107
[58] Field of Search .................................. 367/14, 19, 50, 367/55; 181/107

[56] References Cited

U.S. PATENT DOCUMENTS

| | | | |
|---|---|---|---|
| 3,733,584 | 5/1973 | Pelton et al. | 367/50 |
| 3,972,019 | 7/1976 | Bassett | 367/55 |
| 3,985,199 | 10/1976 | Baird | 181/111 |
| 4,287,597 | 9/1981 | Paynter et al. | 455/12 |
| 4,607,257 | 8/1986 | Noguchi | 368/46 |
| 4,757,482 | 7/1988 | Fiske | 367/144 |
| 4,800,538 | 1/1989 | Passmore, et al. | 367/55 |
| 4,807,259 | 2/1989 | Yamanaka et al. | 375/109 |
| 5,189,642 | 2/1993 | Donoho et al. | 367/15 |
| 5,202,829 | 4/1993 | Geier | 364/449 |
| 5,225,842 | 7/1993 | Brown et al. | 364/449 |
| 5,233,357 | 8/1993 | Ingersunrd et al. | 367/19 |
| 5,319,609 | 6/1994 | Regnault | 367/16 |

FOREIGN PATENT DOCUMENTS 572289  5/1988  Australia .

OTHER PUBLICATIONS

Burnett, R. O. Jr; IEEE Trans. Power Appar. & Syst., vol. PAS–103, #7, pp. 1739–1742, Jul. 1984; abst. only herewith.
Sheriff et al, Exploration Sessimology, Cambridge University Press, p. 191.

*Primary Examiner*—Nelson Moskowitz
*Attorney, Agent, or Firm*—Jacobson, Price, Holman & Stern, PLLC

[57] ABSTRACT

A method for the synchronization of systems for seismic surveys, wherein the systems are composed of subsystems and may be land-based or marine, consists in the survey system being supplied with an absolute time standard and in a time code based on the absolute time standard being generated in the survey system. There is further provided at least one programmable event generator in the survey system and this is synchronized with the absolute time standard. The time for a specific event is predetermined on the basis of given parameters and supplied with the time code which corresponds to this time. The time for a determined event is then supplied to the subsystems which are also provided with the absolute time standard. The event can thereby be executed in one or more of the subsystems on the basis of the supplied absolute time standard and a synchronization is obtained with the desired accuracy. The method can further be used for synchronizing shot times in a seismic signal generating system, and synchronizing the shot recording time and sampling times in a seismic data recording system. The method can also be used for determining the exact time of actually occurring events in a system for seismic surveys.

54 Claims, 4 Drawing Sheets

METHOD FOR SYNCHRONIZATION OF SYSTEMS FOR SEISMIC SURVEYS, TOGETHER WITH APPLICATIONS OF THE METHOD

BACKGROUND OF THE INVENTION

The invention concerns a method for synchronization of systems for seismic surveys and of the systems' subsystems, wherein the systems may be land-based or marine base or combinations of these and the subsystems are composed of, e.g., at least one navigation system, at least one seismic signal generating system and one or more recording systems.

When conducting seismic surveys, whether on land or at sea, it is vitally important to be able to determine the exact times of events and operations and also to be able to establish the exact time relationship between the different operations. In seismic surveys, however, there are a number of potential sources of timing error and these error sources will in turn affect the accuracy of the entire survey system. The use of modern computer technology in the processing of the seismic data has led to the need for an improvement of the accuracy in the time domain. It is a requirement that this accuracy should at least be substantially better than the accuracy and resolution which characterizes the software used and which normally is in the microsecond range. This will also make it possible to solve problems concerning the synchronization of the subsystems in a seismic survey system or the synchronization of several survey systems cooperating in a seismic survey.

According to prior art the synchronization in seismic surveys is based on the fact that the navigation system knows the time, vessel speed and position to an accuracy of approximately 100 ms in the time domain. The navigation system estimates the point in time when the ship arrives at the position for firing the next shot, and when this point in time is reached the navigation system generates an initiating pulse. This pulse is detected by a subsystem for the data recording which in turn generates a shot pulse to the source subsystem, which may be an airgun system. After a certain delay which corresponds to the source subsystem's response time, the shot is fired. At this point in time the source subsystem again generates a pulse which is detected by the recording subsystem, viz. the so-called "field-time-break" (FTB) pulse or time-mark signal. The recording subsystem then begins to sample the signals from the sensors, e.g., hydrophones. The sampling process is normally driver by a free-running oscillator. The signals are usually sampled every other microsecond in a period which normally lasts from 6 s to 8 s. If more than one ship is used in a survey, the initiating pulse is transmitted via a radio modem line to the ship or ships participating in the survey. This radio modem normally uses an audio channel with the delays and inaccuracies inherent in this type of connection. If simultaneous surveys are conducted at widely scattered locations, a broadcast time signal is used to time-mark the data, i.e. the data are not initially synchronized, but marked in such a way that the lack of synchronization can be compensated for during the data processing.

This known method therefore has a number of inherent weaknesses with regard to the synchronization of events, and operations and errors which occur at a point in time or in a subsystem will be transmitted through the system in the subsequent operations with the result that the total system in the time domain will be encumbered with errors which may be difficult to quantify. A generally known technique has been to use standardised time code signals in order, e.g., to synchronize processors in data recording systems. These time code signals may be based on known time code standards, e.g. IRIG (Inter-Range Instrumentation Group) A, B or G or NASA 36. There has, however, been no known method for satisfactorily implementing the use of time codes in seismic survey systems. Furthermore the time code has to be referred to an absolute time standard, e.g., universal time coordinated (UTC). Such an absolute time standard can be obtained to-day via a satellite navigation system, e.g. the global positioning system, (GPS) and, for example, supplied to the navigation system on board a vessel.

BRIEF SUMMARY OF THE INVENTION

Thus the object of the present invention is, based on prior art, to provide a method for synchronization of systems for seismic surveys and of the systems' subsystems, wherein the system may be land-based or marine based, or combinations of these, and the subsystems consist, e.g., of at least one navigation system, at least one seismic signal generating system and one or more recording systems, and which eliminates the disadvantages associated with currently known methods for synchronizing in seismic survey systems.

To be more precise, the object is to provide the means of distributing times for events to all parts of a data recording system, thereby avoiding the use of trigger pulses, while at the same time each subsystem is supplied with the time at the desired high level of accuracy.

These and other objects are achieved according to the present invention by means of a method which is characterized by providing a survey system with an absolute time standard such as, e.g., Universal Time Coordinated (UTC), generating via a time code generator in the survey system a time code based on the absolute time standard, providing at least one programmable event generator in the survey system, the event generator being connected with the time code generator, synchronizing the event generator with the absolute time standard, predetermining the time for a defined event on the basis of given parameters, specifying the time for a defined event, the time code corresponding to the point in time, supplying the time for the defined event to the relevant subsystems, similarly continuously providing the subsystems with the absolute time standard, the event thereby being executed in one or more relevant subsystems on the basis of the continuously supplied, absolute time standard. Further features and advantages of the method according to the invention are presented in the description which follows.

The invention also concerns a number of applications of the method as described below for the calculation and synchronization of the shot time in a seismic signal generating system, the calculation and synchronization of the shot recording time in a seismic data recording system, the synchronization of sampling times in a seismic data recording system and for determining the precise point of time in absolute time for an actually occurring event in a system for seismic surveys.

BRIEF DESCRIPTION OF THE DRAWINGS

The invention will now be described in more detail, partly with reference to embodiments indicated in the accompanying drawing, wherein.

DETAILED DESCRIPTION

Figure 1:
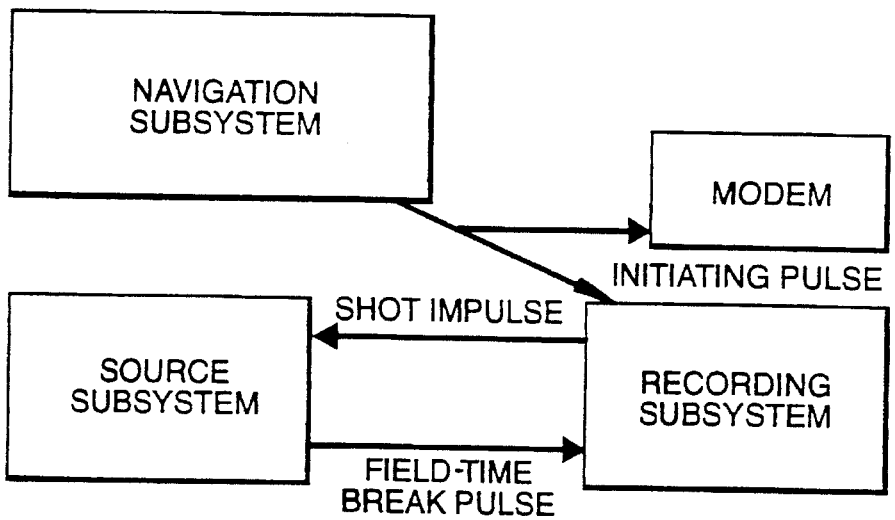
FIG. 1 illustrates schematically the principle of synchronization in a seismic survey system according to prior art.

FIG. 1 illustrates synchronization in a seismic survey system based on prior art. All events are actuated by trigger pulses based on an initiating pulse from a navigation subsystem. The various subsystems such as the source subsystem and the recording subsystem are not supplied with current or local time and the accuracy of the trigger pulses in time is therefore dependent on synchronization with some kind of time standard and the initiating pulses. It is obvious that the transfer and triggering of the pulses in themselves cause delays and inaccuracies which will be transmitted throughout the entire survey.

Figure 2:
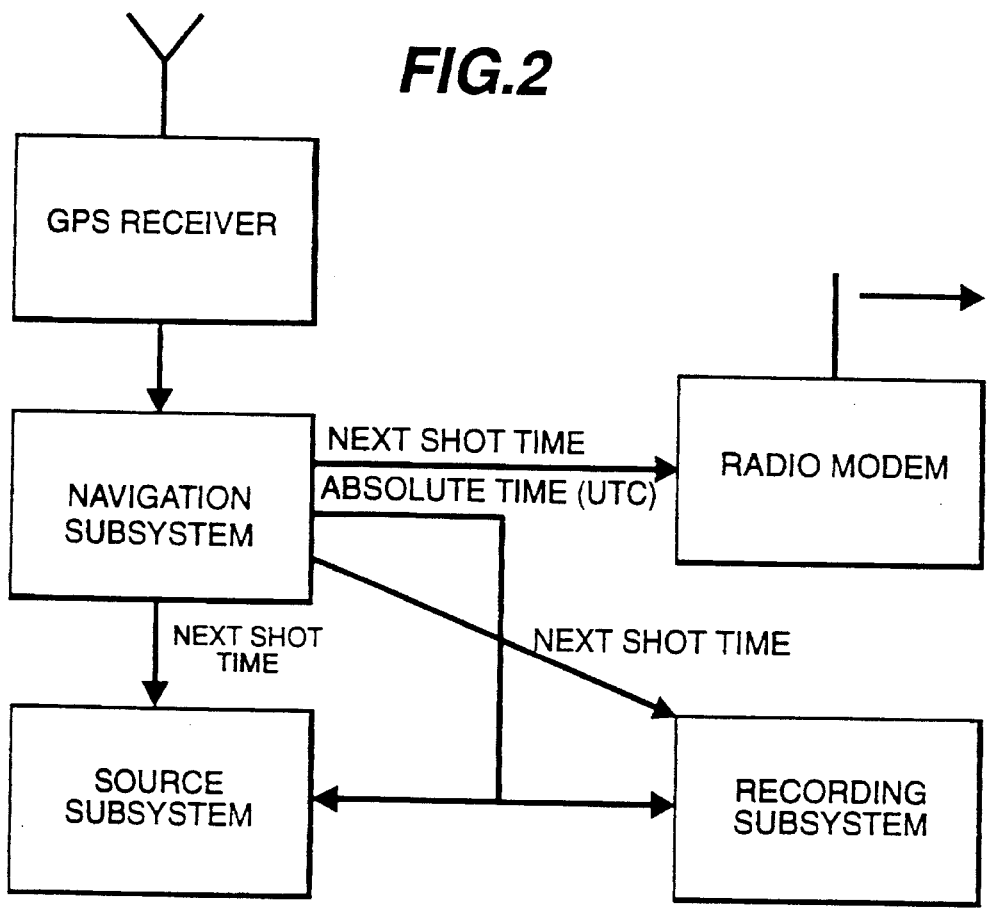
FIG. 2 illustrates schematically synchronization in a seismic survey system according to the present invention.

The method according to the present invention is schematically illustrated in FIG. 2. A receiver receives signals from a satellite navigation system, in this case the so-called Global Positioning System or (GPS) which supplies a time standard to a navigation subsystem which forms part of the seismic survey system. This time standard can, e.g., be Universal Time Coordinated. This time standard is supplied to various subsystems such as the source subsystem and the recording subsystem, while at the same time these systems, e.g., are supplied with shot times. For synchronization with another survey system the time for events is also transferred, in this case the shot time, to a radio modem for transfer to the other survey system.

In the method according to the present invention the synchronization is based on so-called deterministic event generation. This implies that an event will take place simultaneously, i.e. within a period of 10 µs in two or more survey systems. The time for the event or the local time (Time of Day, TOD) is predicted and broadcast from the main system, e.g. a survey vessel, a few seconds before the time when the event is to take place. The broadcast is in the form of a simple computer message. Each system involved in the execution of the event will generate the event internally based on the supplied local time (TOD) and its internal, extremely accurate clock, which, e.g., can indicate the time to an accuracy of 1 µs.

In practice this means that a shot cycle is initiated by the navigation system in the main survey system, the navigation system being used to predict the correct firing position for the source, e.g. an airgun, approximately 2 s before firing takes place. The reference time t=0 or the so-called field-time-break (FTB) is broadcast as local time (TOD) to all survey systems participating in the survey, e.g. all survey vessels. The tuning of the source generating system must have a signal prior to the field-time-break, viz. the firing signal, in order to be able to fire the individual sources or guns correctly in order to produce peak pressure at t=0. This is generated internally by loading secondary local time for this event to the register of a so-called event generator. The recording is initiated at t=0 in a similar manner. If the recording is performed during sampling, resynchronization of the sampling process can be performed, e.g., some time before t=0.

In the method according to the invention an abovementioned so-called programmable event generator is used which is a device whereby a software module can control the time for an event relative to an absolute time standard, e.g. UTC, with an accuracy and resolution which is far better than the time which is available to the actual software.

Thus a programmable event generator can be programmed so that it generates pulses at specific points in time when these are defined, e.g. in UTC or Universal Time Coordinated with an accuracy of 1 µs. A programmable event generator is therefore essentially a sophisticated time control unit and can, e.g., be implemented as a central unit which distributes start pulses or initiating pulses to the various subsystems in a seismic survey system, while at the same time keeping absolute time internally, but it can also be designed as a decentralized system in which absolute time is distributed to time control units, i.e. event generators, in the various subsystems. In both cases the programmable event generator can be synchronized with a broadcast time signal such as GPS.

The navigation subsystem in the survey system knows, e.g. the time, vessel speed and position to an accuracy of 100 µs. It estimates the time for the next shot some time in advance and distributes the shot time to the other subsystems. Every subsystem knows its own parameters and calculates internal times for events. These times are loaded, e.g., to the locally provided event generator which in turn generates the correct pulses at the pre-programmed times. If several vessels are involved in the seismic survey, the shot time is transmitted via radio to the other ship or ships, which are equipped with similar systems and can synchronize these in the same way.

The source generating subsystem (the guns) receives the time for the next shot and on the basis of inherent knowledge of the delays in the different guns, times are calculated for firing the pulses for the individual guns. These times are supplied to the event generator which generates firing pulses at the correct times. The recording subsystem also receives the time for the next shot and calculates all sampling times for this shot. Accuracy and resolution in the time domain are now more than adequate. The hydrophone signals are then sampled at exact times relative to an absolute time standard such as UTC during the entire acquisition period which may, e.g., be 6–8 s. There is therefore no need for a free-running oscillator.

If more than one survey system, e.g. if several ships are involved in the seismic survey, the same operations are performed on all ships. This guarantees that no significant difference occurs in the shot time and sampling times in the survey systems involved. If the survey is conducted at widely scattered locations, there is also the guarantee that the sampling will be synchronous in all the locations, since the absolute time standard used is, of course, the same and supplied in the same way.

It should be noted that the required accuracy in time before the shot is fired is dependent, e.g., on the speed of the vessel and approximately 100 µs is usually sufficient, while the required accuracy after the shot has been fired, i.e. during the data acquisition, is dependent on the sound velocity in the subsurface and thus an accuracy and resolution of 10 µs between the individual survey systems, e.g. survey vessels, is necessary.

Some practical examples of the implementation of the method according to the invention will now be described.

Figure 3:
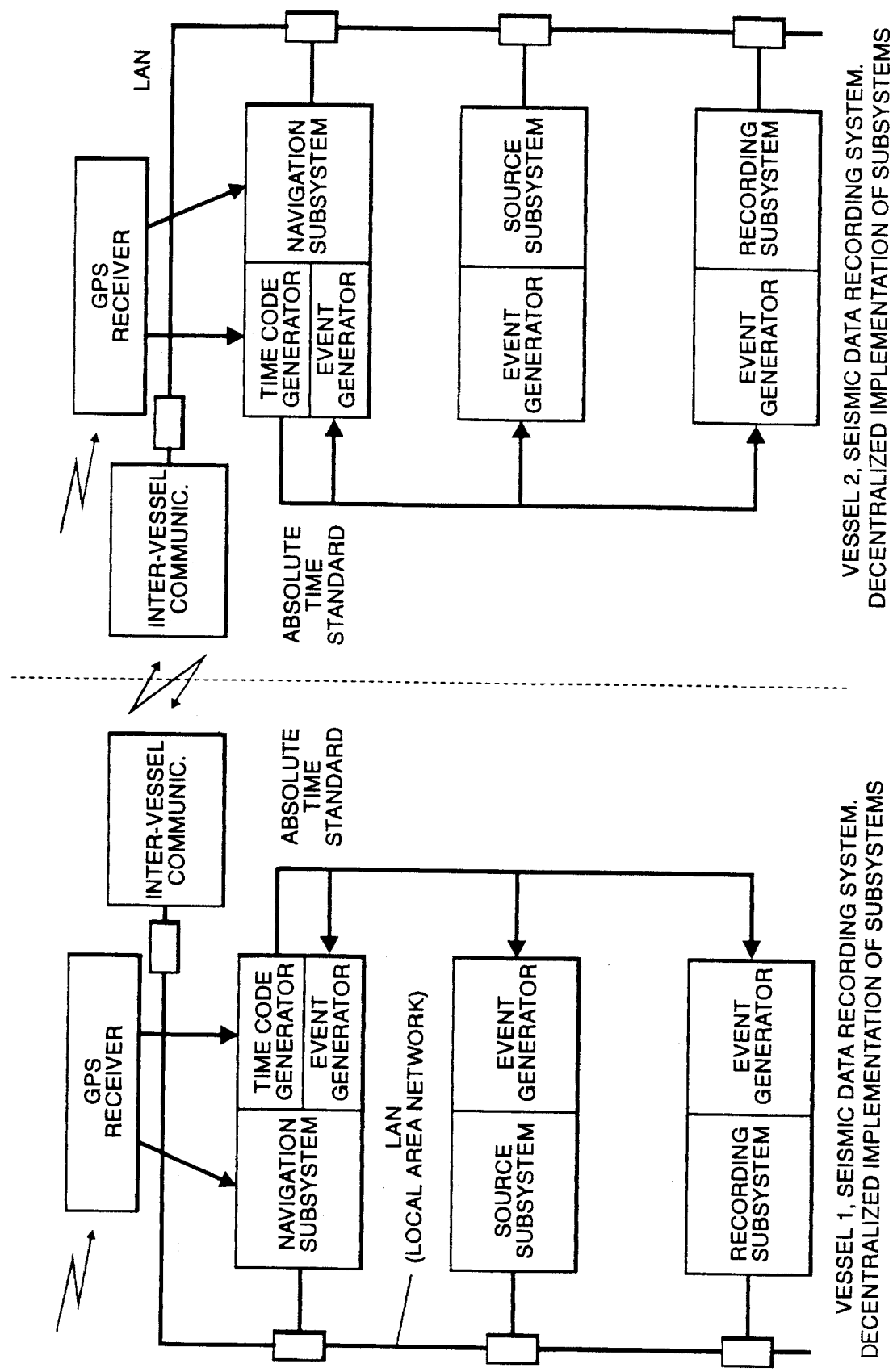
FIG. 3 illustrates synchronization between two systems for seismic surveys, wherein the method according to the invention is implemented in a decentralized manner.

FIG. 3 illustrates the synchronization of seismic survey systems with decentralized implementation of the method. The two survey systems used may be a first and a second vessel 12. Each survey system comprises a navigation subsystem which is connected to a GPS receiver. In the navigation subsystem there is provided a time code generator which generates a time code based on an absolute time standard which is received via the GPS receiver, and which, e.g., can be UTC. The time code used can, for example, be NASA 36 or an IRIG time code such as IRIGA, IRIG-B or IRIG-G. The three last-mentioned time codes operate with basic periods of 0.1 s, 1 s and 0.01 s. A programmable event generator is provided in each subsystem and the event generator receives the absolute time standard in the form of a time code from the time code generator. The subsystems, each with its event generator, communicate via a local area network (LAN) which is linked to the rest of the vessel's communication system, communication between the individual survey systems taking place via a radio modem. Since synchronization in every survey system is based on an absolute time standard transmitted via GPS, it is only the time for the event which has to be transmitted via radio and synchronization takes place in the same way and with the same accuracy in all the survey systems.

Figure 4:
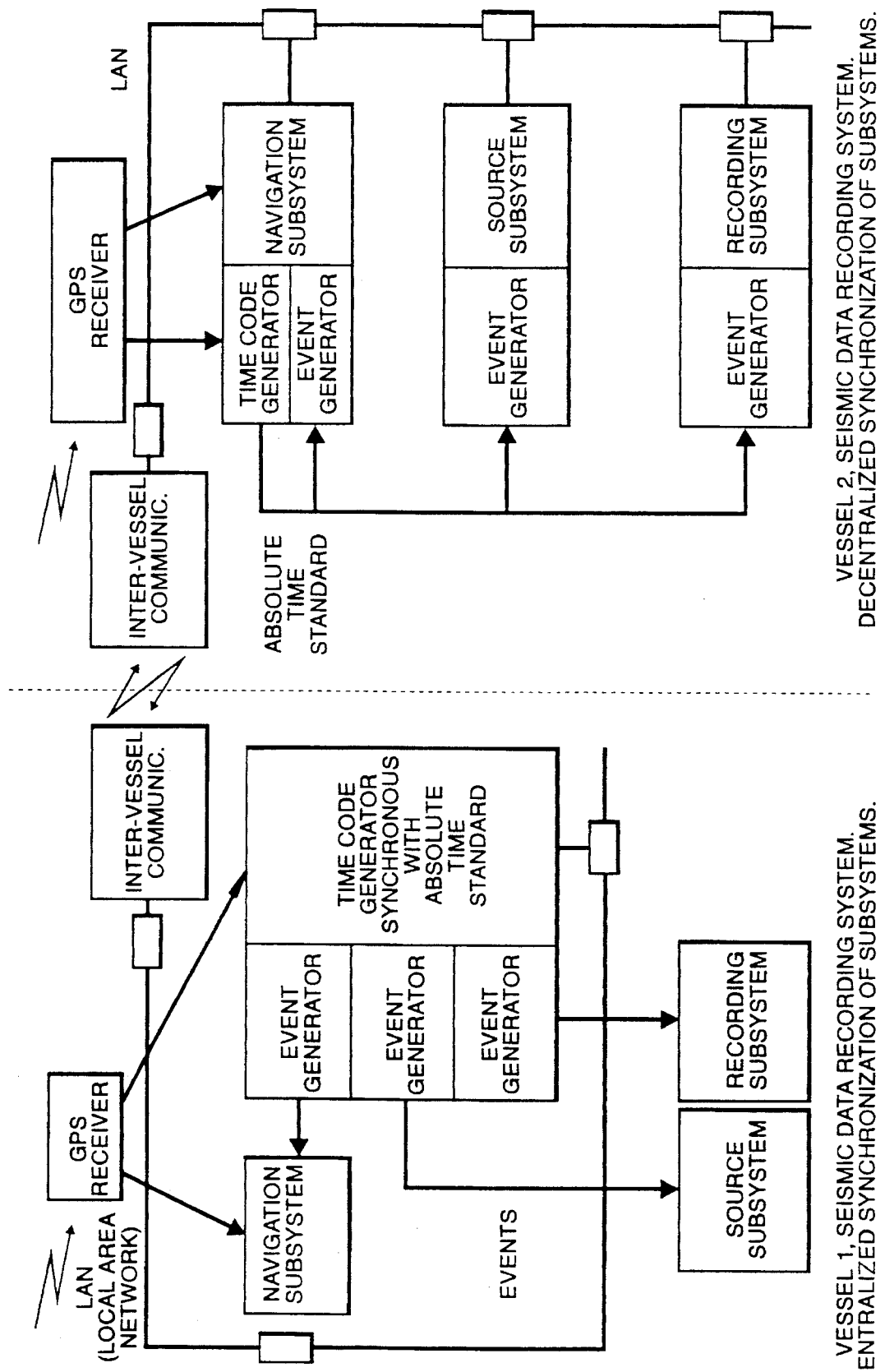
FIG. 4 illustrates synchronization between two systems for seismic surveys, with centralized and decentralized implementation of the method respectively.
Figure 5:
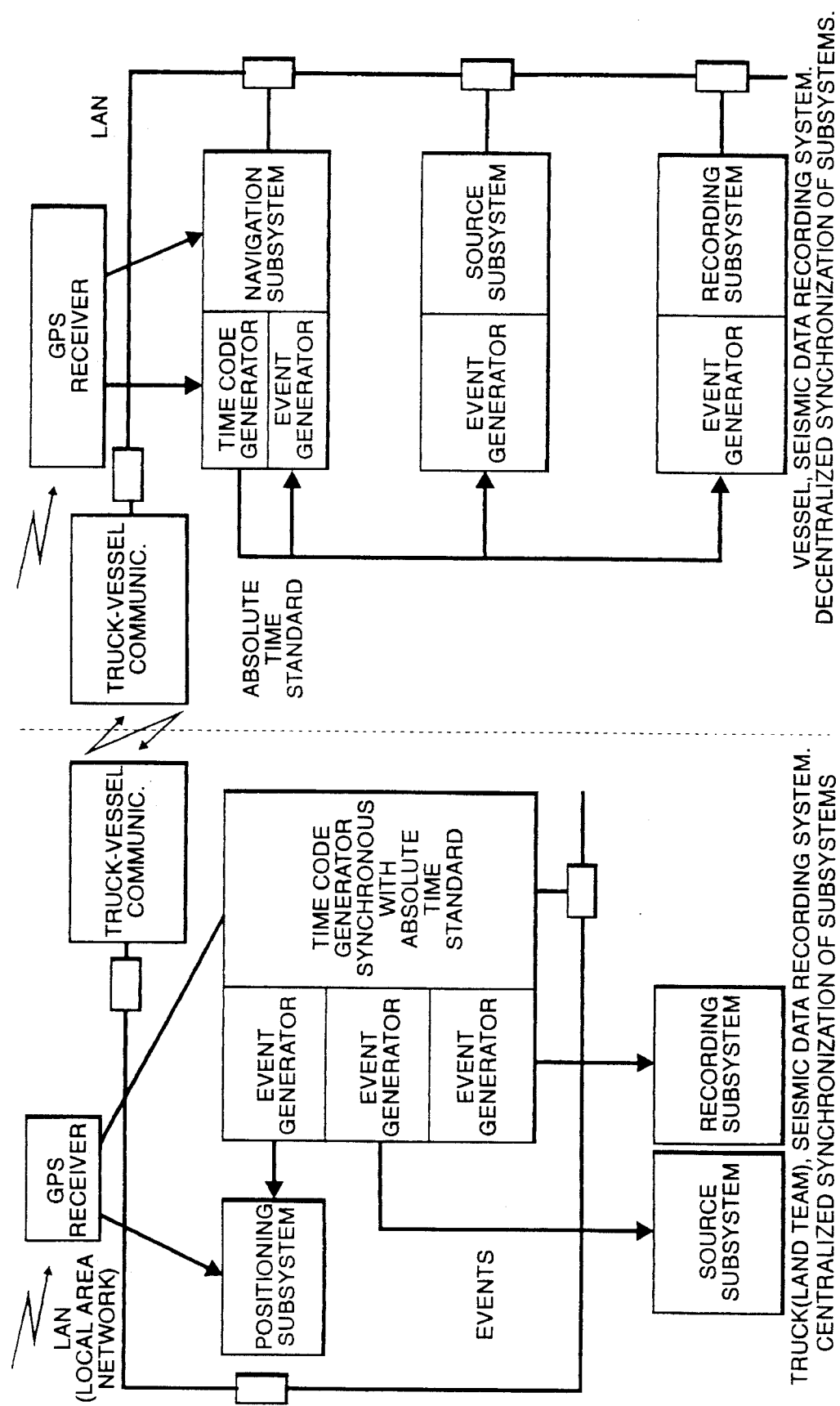
FIG. 5 illustrates synchronization between two systems for seismic surveys according to the present invention, wherein one survey system is land-based and the other survey system is ship-based.

FIG. 4 illustrates an example of implementation of the method according to the invention in a centralized and a decentralized version respectively. Vessel 2 has the decentralized implementation which was used in the systems in FIG. 3, while vessel 1 is equipped with a centralized system. The event generators are now provided together with the time code generator which is synchronized with the absolute time standard. The time for the event is supplied from each of the event generators to the respectively provided subsystem. Once again all subsystems are linked to a local area network (LAN) and communication between the survey systems takes place as before by radio. The only difference therefore is that the synchronization of the survey system indicated as vessel 1 takes place centrally and not in each of the subsystems. In the same way as in FIG. 4, FIG. 5 illustrates how the synchronization of a land-based survey system and a marine survey system can be performed. The land-based survey system includes, for example, a truck as the vessel, and corresponds to the implementation on vessel 1 in FIG. 4, the navigation system being replaced by a positioning system.

Centralized implementation may be preferable in land-based systems, where equipment and survey methods differ from those used in marine surveys. In a centralized implementation, moreover, it is conceivable that all synchronization means such as the time code generator and the event generator could be integrated in, e.g., the navigation system, which may also include the GPS receivers.

As mentioned in the introduction, the method according to the invention will primarily be used in connection with the synchronization of shot times, shot recording times and sampling times in seismic data recording systems. Another application which may become important is quality control in a system for seismic surveys, in which the method according to the invention can be used to test the accuracy in the time domain, the real times for events via the event generator and expressed in an absolute time standard being supplied to a central data processing system. A person skilled in the art will realize that in principle this represents almost a reversal of the actual synchronization method. A quality control of this kind, however, is extremely relevant in modern seismic data processing, where the use of three-dimensional seismic techniques places a completely different set of demands on accuracy and data processing capacity than was the case in two-dimensional seismic technology.

A person skilled in the art will also realize that the method according to the invention can be implemented in other ways than those described here and in reality could also be used in data recording and measuring systems outside the seismic field. It should also be understood that the method according to the invention is in no way limited to use with those time codes and time standards described here, nor does it require to be based on the Global Positioning System, but the demands which the method according to the invention places on accuracy in time and space should at least be capable of being maintained on the basis of those standards and external systems which are utilized.

We claim:

1. A method for synchronization of systems for seismic surveys and of subsystems of said systems, said systems being selected from the group consisting of land-based systems, marine-based systems, and a combination thereof, and said subsystems being selected from the group consisting of at least one navigation system, at least one seismic signal generating system and at least one recording system comprising:

supplying a survey system with an absolute time standard;

generating via a time code generator in said survey system a time code based on said absolute time standard;

providing at least one programmable event generator in said survey system;

connecting said event generator with said time code generator;

synchronizing said event generator with said absolute time standard;

predetermining the time for a defined event on the basis of given parameters;

providing the time for a defined event with said time code corresponding to a point in time;

supplying the time for said defined event to the respective subsystems;

continuously supplying said subsystems with said absolute time standard; and executing said defined event in at least one respective subsystem on the basis of said continuously supplied absolute time standard.

2. The method as claimed in claim 1, and further comprising:

generating said time code in said time code generator on the basis of Universal Time Coordinated (UTC) absolute time standard; and supplying a time signal to said time code generator for said UTC from a satellite navigation system.

3. The method as claimed in claim 2 and further comprising:

generating an Inter-Range Instrumentation Group time code (IRIG time code) by said time code generator.

4. The method as claimed in claim 3 and further comprising:

connecting said time code generator with at least one programmable event generator in each subsystem.

5. The method as claimed in claim 2 and further comprising:

synchronizing said programmable event generator on the basis of said (UTC) absolute time standard by supplying said code by said time code generator.

6. The method as claimed in claim 5 and further comprising:
   supplying said predetermined time for said defined event to a programmable event generator in a respective subsystem.
7. The method as claimed in claim 6 and further comprising:
   supplying said programmable event generator with said time code for said absolute time standard.
8. The method as claimed in claim 7 and further comprising:
   initiating said defined event by said programmable event generator on the basis of said predetermined time and in synchronization with real time as indicated by said continuously supplied time code.
9. The method as claimed in claim 8 and further comprising:
   connecting said programmable event generator and said time code generator with said satellite navigation system.
10. The method as claimed in claim 9 and further comprising:
    generating said parameters for predetermining said time for said defined event on the basis of continuous position finding in said navigation system.
11. The method comprising:
    applying said method as claimed in claim 1 for calculation and synchronization of shot time in a seismic signal generating system.
12. The method comprising:
    applying said method as claimed in claim 1 for calculation and synchronization of shot recording time in a seismic data recording system.
13. The method comprising:
    applying said method as claimed in claim 1 for calculation and synchronization of sampling times in a seismic data recording system.
14. The method comprising:
    applying said method as claimed in claim 1 for determination of the precise point of time in absolute time for an actually occurring event.
15. The method as claimed in claim 2 wherein:
    said satellite navigation system comprises a global positioning system (GPS).
16. The method as claimed in claim 15 and further comprising:
    synchronizing said programmable event generator on the basis of said (UTC) absolute time standard by supplying said code directly via said GPS.
17. The method as claimed in claim 15 and further comprising:
    supplying said predetermined time for said defined event to a programmable event generator in a respective subsystem.
18. The method as claimed in claim 17 and further comprising:
    supplying said programmable event generator with said time code for said absolute time standard.
19. The method comprising:
    applying said method as claimed in claim 10 for calculation and synchronization of shot time in a seismic signal generating system.
20. The method comprising:
    applying said method as claimed in claim 10 for calculation and synchronization of shot recording time in a seismic data recording system.
21. The method comprising:
    applying said method as claimed in claim 2 for calculation and synchronization of shot time in a seismic signal generating system.
22. The method comprising:
    applying said method as claimed in claim 2 for calculation and synchronization of shot recording time in a seismic data recording system.
23. The method comprising:
    applying said method as claimed in claim 2 for calculation and synchronization of sampling times in a seismic data recording system.
24. The method comprising:
    applying said method as claimed in claim 2 for determination of the precise point of time in absolute time for an actually occurring event.
25. The method comprising:
    applying said method as claimed in claim 3 for calculation and synchronization of shot time in a seismic signal generating system.
26. The method comprising:
    applying said method as claimed in claim 3 for calculation and synchronization of shot recording time in a seismic data recording system.
27. The method comprising:
    applying said method as claimed in claim 3 for calculation and synchronization of sampling times in a seismic data recording system.
28. The method comprising:
    applying said method as claimed in claim 3 for determination of the precise point of time in absolute time for an actually occurring event.
29. The method comprising:
    applying said method as claimed in claim 4 for calculation and synchronization of shot time in a seismic signal generating system.
30. The method comprising:
    applying said method as claimed in claim 4 for calculation and synchronization of shot recording time in a seismic data recording system.
31. The method comprising:
    applying said method as claimed in claim 4 for calculation and synchronization of sampling times in a seismic data recording system.
32. The method comprising:
    applying said method as claimed in claim 4 for determination of the precise point of time in absolute time for an actually occurring event.
33. The method comprising:
    applying said method as claimed in claim 5 for calculation and synchronization of shot time in a seismic signal generating system.
34. The method comprising:
    applying said method as claimed in claim 5 for calculation and synchronization of shot recording time in a seismic data recording system.
35. The method comprising:
    applying said method as claimed in claim 5 for calculation and synchronization of sampling times in a seismic data recording system.
36. The method comprising:
    applying said method as claimed in claim 5 for determination of the precise point of time in absolute time for an actually occurring event.

37. The method comprising:
applying said method as claimed in claim 6 for calculation and synchronization of shot time in a seismic signal generating system.

38. The method comprising:
applying said method as claimed in claim 6 for calculation and synchronization of shot recording time in a seismic data recording system.

39. The method comprising:
applying said method as claimed in claim 6 for calculation and synchronization of sampling times in a seismic data recording system.

40. The method comprising:
applying said method as claimed in claim 6 for determination of the precise point of time in absolute time for an actually occurring event.

41. The method comprising:
applying said method as claimed in claim 7 for calculation and synchronization of shot time in a seismic signal generating system.

42. The method comprising:
applying said method as claimed in claim 7 for calculation and synchronization of shot recording time in a seismic data recording system.

43. The method comprising:
applying said method as claimed in claim 7 for calculation and synchronization of sampling times in a seismic data recording system.

44. The method comprising:
applying said method as claimed in claim 7 for determination of the precise point of time in absolute time for an actually occurring event.

45. The method comprising:
applying said method as claimed in claim 8 for calculation and synchronization of shot time in a seismic signal generating system.

46. The method comprising:
applying said method as claimed in claim 8 for calculation and synchronization of shot recording time in a seismic data recording system.

47. The method comprising:
applying said method as claimed in claim 8 for calculation and synchronization of sampling times in a seismic data recording system.

48. The method comprising:
applying said method as claimed in claim 8 for determination of the precise point of time in absolute time for an actually occurring event.

49. The method comprising:
applying said method as claimed in claim 9 for calculation and synchronization of shot time in a seismic signal generating system.

50. The method comprising:
applying said method as claimed in claim 9 for calculation and synchronization of shot recording time in a seismic data recording system.

51. The method comprising:
applying said method as claimed in claim 9 for calculation and synchronization of sampling times in a seismic data recording system.

52. The method comprising:
applying said method as claimed in claim 9 for determination of the precise point of time in absolute time for an actually occurring event.

53. The method comprising:
applying said method as claimed in claim 10 for calculation and synchronization of sampling times in a seismic data recording system.

54. The method comprising:
applying said method as claimed in claim 10 for determination of the precise point of time in absolute time for an actually occurring event.

* * * * *